United States Patent Office 3,463,383
Patented Aug. 26, 1969

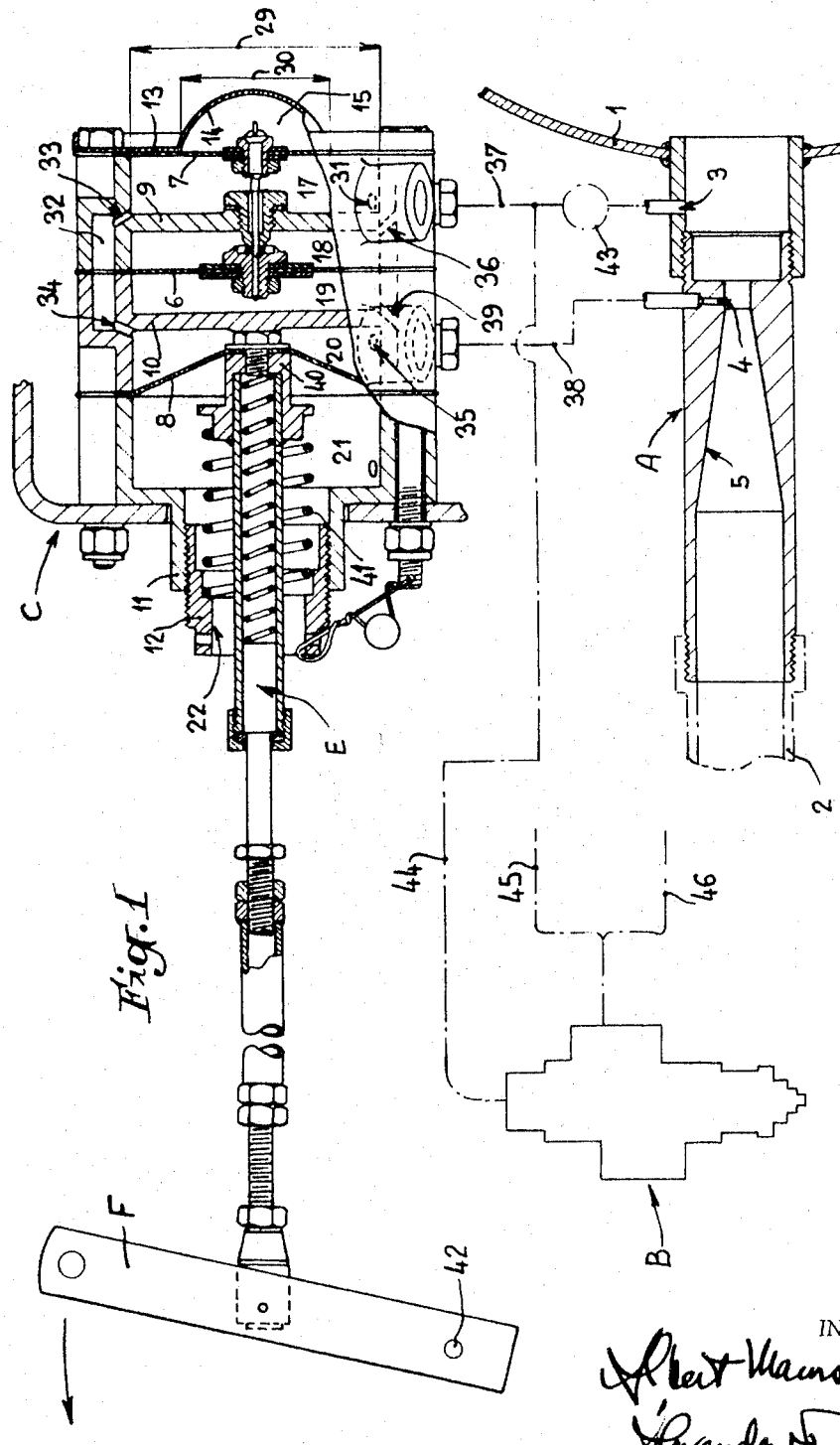

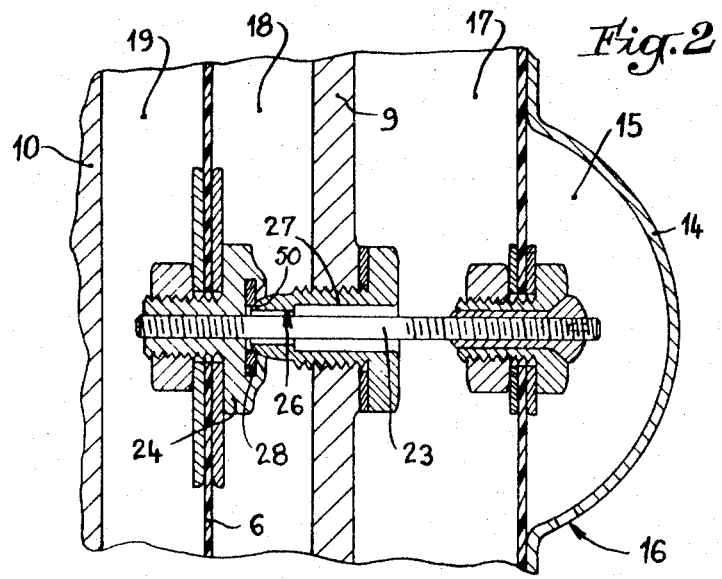
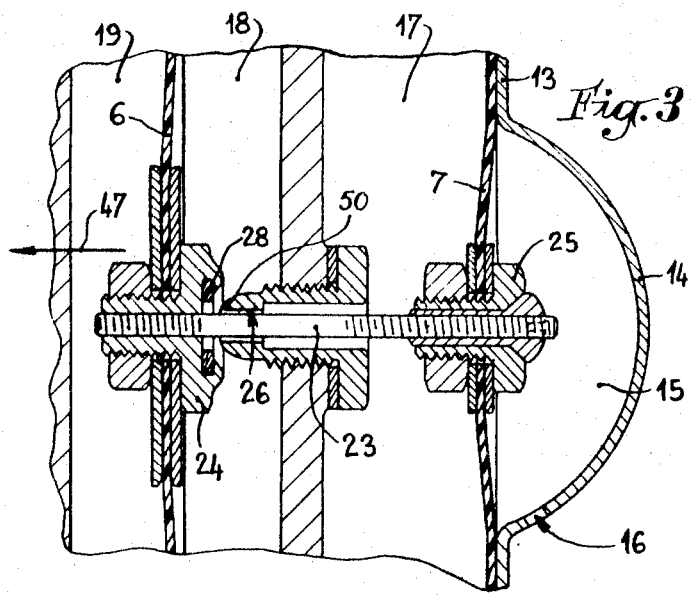

3,463,383
REGULATION SYSTEM FOR GAS
COMPRESSORS
Albert Maurs, Lyon, France, assignor to Compresseurs
 Bernard, Curie, Venissieux, Rhone, France, a French
 joint-stock company
Filed Oct. 9, 1967, Ser. No. 673,601
Int. Cl. F04b *49/08;* F04d *27/00*
U.S. Cl. 230—10                        6 Claims

ABSTRACT OF THE DISCLOSURE

A regulation system for a gas compressor has a detector A in the form of a venturi meter, and this operates a control box C which controls an operating lever F adapted to regulate the speed of the compressor motor. Because the detector A functions independently of the absolute pressure in the reservoir 1, the compressor is regulated only in response to the flow of gas through the detector A. A sensitive diaphragm system is used in the control box C.

---

The present invention relates to improvement in the regulating systems used with various types of gas compressors, principally air compressors.

It is known to direct the output of a compressor into and intermediate reservoir or tank, where it is proposed to maintain a fairly constant pressure whatever may be the amount of air later drawn off from this tank. For this purpose it is known to fit the tank with a pressure sensitive component which acts on the output of the compressor, for example, by maintaining the inlet valves more or less open, according to whether the pressure within the tank remains or does not remain within predetermined limits and by varying the speed of the driving motor by action upon the speed or load lever.

This simple system has various disadvantages and in particular it has sluggish operation of the regulating system in response to the sudden drawing off of a large output of compressed gas.

The invention aims at mitigating these disadvantages by providing a regulating system of considerable strength while assuring precise operation to equalise as exactly as possible the output furnished by the compressor and that needed by the user.

Given that the equalisation of these outputs only by means of the pressure existing in the tank is a convenient, but indirect and imprecise method, the invention consists of regulating the speed of the motor which drives the compressor in relation to the output of compressed air drawn off by the user, which allows instantaneous reactions by the regulation system, directly in relation to the outputs utilised.

According to this invention a method of regulating a gas compressor comprises detecting the rate of flow of gas through an outlet independently of the absolute pressure on the upstream side of the outlet and varying the speed of operation of the compressor in relation to the detected variations in the output gas flow.

According to a preferred feature of the invention, apparatus for carrying out the method comprises detection means for detecting the rate of gas flow through an outlet in dependently of the absolute pressure of gas on the upstream side of the outlet, and a control device adapted to be operated in response to the operation of the detection means to vary the speed of operation of the compressor. Preferably a pressure responsive mechanism is provided which is adapted to be operated by gas from the outlet passage to establish a pressure equilibrium related to the detected differential pressure, the pressure so established being used to operate the control device.

Naturally the regulating device according to the invention may be coupled with any pressure-sensitive system of known type in order to obtain a mixed regulation both by the tank pressure and by the output of air utilised.

One arrangement of control apparatus for a gas compressor in accordance with the invention will now be described, by way of example only, with reference to the accompanying drawings in which:

FIGURE 1 is a general diagram with a part section of a device according to the invention for mixed regulation, both in relation to the output of air utilised and to the pressure existing in the tank, FIGURES 2 and 3 are part sectional views corresponding to FIGURE 1, but showing to a larger scale the assembly of first and second diaphragms in two different working positions.

There is shown in the drawings a device according to the invention for mixed regulation which comprises three main assembles, that is to say, an output detector A, a pressure detector B, and a control box C.

The detector A is fitted in series between a compressor tank 1 and piping 2 (shown in broken lines) by which the user draws off compressed air from the said tank 1. This detector A is formed by a choke or venturi on the upstream side of which a first outlet aperture 3 is provided. A second outlet aperture 4 is drilled in the constricted section, that is to say, immediately above the divergent diffuser 5.

The control box C comprises three suitably spaced coaxial diaphragms indicated respectively by the references 6, 7 and 8. A fixed partition 9 is provided between the first diaphragm 6 and the second diaphragm 7. Similarly a fixed partition 10 is interposed between the first diaphragm 6 and the third diaphragm 8. On the other side of the diaphragm 8 (that is to say, to the left in FIGURE 1) the box C terminates in a socket 11 in which is screwed an adjustable stop-sleeve 12 which will be described later.

At the other end (that is to say, to the right in FIGURE1) this box C is closed by a fixed cover 13 of which the domed central part 14 forms a chamber 15 behind the diaphragm 7, communicating with the air through an orifice 16.

The assembly thus arranged therefore forms, besides the chamber 15 just described:

A chamber 17 situated between the second diaphragm 7 and the partition 9;

A chamber 18 interposed between the partition 9 and the first diaphragm 6;

A chamber 19 separating the first diaphragm 6 and the partition 10;

A chamber 20 between the partition 10 and the third diaphragm 8;

And a chamber 21 situated beyond the diaphragm 8 and opening to the atmosphere by a large aperture 22 provided in the centre of the sleeve 12.

The diaphragms 6 and 7 are linked at their centres by a stem 23 of constant length. The distance apart of the diaphragms 6 and 7 may be adjusted as required by screwing the threaded ends of the stem 23 into or out of the anchoring ferrules 24 and 25 provided on the diaphragms 6 and 7 respectively, where they provide movable couplings.

The stem 23 passes, with radial play, through an axial bore 26 provided in a fixed bush 27 screwed in the centre of the partition 9. The radial play between the bore 26 and the stem 23 puts the two chambers 18 and 17 into communication, unless an annular sealing joint 28 fitted to the ferrule 24 of the diaphragm 6, blocks the boss by resting on a fixed seat 50 formed by the corresponding end of the bush 27, as shown in FIGURE 2.

The cover 13 has a flat interior face upon the whole of which the diaphragm 7 is able to come to rest (FIGURES 1 and 2). In addition the diameter 29 of the useful part of the diaphragm 7 (that is to say, the interior diameter of the chamber 17) is preferably equal to double to triple the diameter 30 of the chamber 15 (FIGURE 1).

The chamber 17 opens to the external atmosphere through a calibrated jet 31. In addition it communicates with the chamber 20 by means of a manifold 32 which an aperture 33 joins to the chamber 17, whilst an aperture 34 joins it to the chamber 20. This chamber 20 opens in its turn to the external atmosphere by a jet 35.

The chamber 18 is joined by an aperture 36 and a pipe 37 to the first aperture 3 of the output detector A. The aperture 4 of this same detector is joined by a pipe 38 and an aperture 39 to the chamber 19 of the control box C.

Finally, the central part of the third diaphragm 8 is attached to a ferrule 40 which tends to come to reset against the fixed partition 10 when it is subject only to the action of a return spring 41, which bears in addition on a shoulder of the sleeve 12. This ferrule 40 controls, by means of telescopic spring mechanism E of known type, the component F which governs the speed of the compressor motor. This component F is generally formed by a lever which pivots on a shaft 42, and which controls the movement of the rack of an injection pump if the motor is a diesel engine.

In the immediate vicinity of the aperture 3 an air filter 43 is preferably inserted into the pipe 37 in order to prevent dirt from penetrating into the circuit.

In the case of a mixed regulation both by output and by pressure, there is mounted on the chamber 20 a pressure detector B of known type, whch is generally constituted by a three-way pressure-sensitive valve. Pressure is taken from the pipe 37, below the filter 43 by a pipe 44 which directs it upon the detector B. The latter can then:

Either send the pressure of the pipe 44 into a pipe 45 and thus maintain the decompression system of the compressor, which then provides a nil, or at least reduced output;

Or shut off the pipe 44 and put the decompression pipe 45 in communication with the atmosphere, which immediately causes a fall in pressure and causes output from the compressor. In addition generally there is connected in parallel with the pipe 45 another pipe 46 which operates the inter-phase purger of the compressor.

The operation of the apparatus is as follows:

If the output drawn off from the tank 1 by the pipe 2 is nil, the pressures detected at the apertures 3 and 4 are equal, and in consequence, the diaphragm 6 remains at rest between the two chambers 18 and 19, which are at the same pressure. The sealing joint 28 is then applied on the ferrule 27 and blocks the passage between the chambers 17 and 18 which are thus separated the one from the other. The chambers 15, 17, 20 and 21 are then all at atmospheric pressure, and the diaphragm 8, subject only to the action of the spring 41, occupies the rest position shown in FIGURE 1. The control component F of the motor thus occupies a given position which, it will be seen, is independent of the pressure valve obtaining simultaneously in the chambers 18 and 19. Whether the compressor gives an output or not is then solely in relation to the pressure detector B which operates in the usual manner.

On the other hand, as soon as an output passes through the venturi of the detector A, the pressure at the level of the aperture 4 becomes inferior by a value X to the pressure P which is detected by the aperture 3. This difference of pressure X is reflected between the chambers 18 (where pressure P obtains) and 19 (which is at the pressure $P-X$), and there results from this a reaction on the diaphragm 6 which tends to displace it in the direction shown in FIGURE 3 by the arrow 47. It is important to note that this reaction is independent of the absolute level of pressure in the tank 1, and that its intensity depends solely upon the size of the output drawn off through the pipe 2.

The pressure difference X thus causes a displacement of the diaphragm 6 in the direction of the arrow 47, and the diaphragm 7 follows this movement under the action of the stem 23 which draws it (FIGURE 3). The joint 28 then uncovers the air passage and puts the chambers 17 and 18 into communication through the bore 26.

Compressed air is therefore admitted into the chamber 17 to escape to the atmosphere through the calibrated jet 31. The diaphragm 7 is then subject to a thrust towards the right (FIGURE 1) which has the effect of reclosing the valve 27–28 owing to the connecting stem 23.

There is thus established in the chamber 17 an equilibrium pressure $X_1$ which is proportionate to the difference of pressure X acting on the two faces of the diaphragm 6.

Given that the pressure $X_1$ of the chamber 17 acts only on the central part corresponding to the diameter 30 of the diaphragm 7, it will be seen that the pressure $X_1$ remains in constant proportion to X, the proportion factor being equal to the relation of the surfaces of the diaphragm 6 on the one hand and of the central portion corresponding to the diameter 30 of the diaphragm 7 on the other hand.

In practice, if a proportion factor equal to 3 is chosen, and the drop of pressure X varies between 0 and 0.4 bar, it will be seen that the pressure $X_1$ in the chamber 17 will vary between 0 and 1.2 bar. This pressure $X_1$ is a function of the output required by the user through the detector A.

When equilibrium of the pressures is thus realised, the pressure $X_1$ is established also in the chamber 20 and in the manifold 32. In consequence it operates on the diaphragm 8 and it will be seen that to a given value of output in the pipe 2 there corresponds a well-defined deformation of the diaphragm 8 against the spring 41, which acts precisely on the control component F of the motor. In particular this component F is acted upon independently of the absolute value of the pressure obtaining in the tank.

It will be seen that the regulating system according to the invention eliminates all mechanical friction and allows a precise and progressive operation to be obtained.

It must moreover be understood that the preceding description has been given only by way of example, and that it in no way limits the scope of the invention which will not be avoided by replacing the manufacturing details described by any other equivalents.

In particular, the scope of the invention will not be avoided by using the control components A and C with or without the pressure detector B, this latter being able moreover to be of any known type. The nozzle A could equally be replaced by any other component creating a fall in pressure in function of the output.

What is claimed is:

1. Apparatus for regulating a gas compressor comprising: a gas outlet, detection means operating independently of the absolute pressure of gas within said outlet for detecting the rate of flow of gas through said outlet and a compressor speed-control device having a pressure responsive part operative under the control of said detection means; said detection means being comprised of a restriction in said outlet passage, a control box, a first diaphragm within said control box and two conduits, the first of said two conduits leading from said outlet passage at said restriction to said control box on one side of said first diaphragm, and the second of said two conduits leading from said outlet at a position upstream of said restriction to said control box on the opposite side of said first diaphragm, a pressure responsive mechanism within said control box comprising a second diaphragm having an effective area smaller than said first diaphragm, a wall having an aperture therethrough disposed intermediate said first and second diaphragms, stem means having a cross-section smaller than said aperture interconnecting said first and second diaphragms for conjoint movement, valve means mounted on said stem means for opening and closing said aperture, said pressure responsive mechanism establishing with said first diaphragm a pressure equilibrium within a chamber intermediate said wall and said second diaphragm at a pressure related to the differential pressure registered by said first diaphragm and means connecting said chamber with said pressure responsive part of said control device.

2. Apparatus according to claim 1, wherein said control device includes a third diaphragm arranged within another chamber of said control box, and resilient means acting on said third diaphragm in opposition to pressure from said first chamber.

3. Apparatus according to claim 2, wherein said control device further includes a pivoted lever acting directly on the compressor to control the speed of operation of the compressor, and mechanical means connecting said third diaphragm to said lever.

4. Apparatus according to claim 2, wherein all three said diaphragms are arranged coaxially in said control box.

5. Apparatus according to claim 2, wherein said third diaphragm is so mounted that it rests under the action of said resilient means against a wall of said box so long as the output of gas through said outlet is zero.

6. Apparatus for regulating a gas compressor comprising: a gas outlet, detection means operating independently of the absolute pressure of gas within said outlet for detecting the rate of flow of gas through said outlet and a compressor speed-control device having a pressure responsive part operative under the control of said detection means; said detection means being comprised of a restriction in said outlet passage, a control box, a first diaphragm within said control box and two conduits, the first of said two conduits leading from said outlet passage at said restriction to said control box on one side of said first diaphragm, and the second of said two conduits leading from said outlet at a position upstream of said restriction to said control box on the opposite side of said first diaphragm, a pressure responsive mechanism within said control box, means connecting said first conduit with said pressure responsive mechanism, said pressure responsive mechanism establishing with said diaphragm a pressure equilibrium within a chamber of said control box at a pressure related to the differential pressure registered by said diaphragm, and means connecting said chamber with said pressure responsive part of said control device, said pressure responsive mechanism comprising a second diaphragm mechanically coupled to said first diaphragm, the effective area of said second diaphragm being smaller than that of said first diaphragm, as gas passage within said control box between that side of said first diaphragm which is in communication with the upstream side of said restriction and one side of said second diaphragm, the opposite side of said second diaphragm being opened to the atmosphere, valve means for controlling gas flow through said gas passage, said valve means being controlled by said first and second diaphragms.

References Cited
UNITED STATES PATENTS

| | | | |
|---|---|---|---|
| 1,110,864 | 9/1914 | Banner | 230—10 |
| 1,154,959 | 9/1915 | Banner | 230—10 |
| 2,533,627 | 12/1950 | Roach | 103—19 |
| 2,886,968 | 5/1959 | Johnson et al. | |
| 2,944,488 | 7/1960 | Meyer | 103—16 |

HENRY F. RADUAZO, Primary Examiner

U.S. Cl. X.R.

230—11, 114